US006961676B2

(12) United States Patent
Miyazaki et al.

(10) Patent No.: US 6,961,676 B2
(45) Date of Patent: Nov. 1, 2005

(54) APPARATUS FOR SUPPORTING MAINTENANCE CHECK OF A SENSOR

(75) Inventors: Haruyuki Miyazaki, Shizuoka (JP);
Harushi Muramatsu, Shizuoka (JP);
Hiroki Oishi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 83 days.

(21) Appl. No.: 10/771,373

(22) Filed: Feb. 5, 2004

(65) Prior Publication Data

US 2004/0172218 A1 Sep. 2, 2004

(30) Foreign Application Priority Data

Feb. 28, 2003 (JP) .............................. 2003-053418

(51) Int. Cl.[7] ........................ G06F 15/00; G01G 19/08
(52) U.S. Cl. ..................................... 702/184; 177/136
(58) Field of Search ..................... 702/184; 340/666; 200/85 R; 177/50, 136

(56) References Cited

U.S. PATENT DOCUMENTS

| | | | | |
|---|---|---|---|---|
| 4,194,195 A | * | 3/1980 | Merrell et al. ............... | 340/661 |
| 4,832,141 A | * | 5/1989 | Perini et al. ................. | 177/141 |
| 4,919,222 A | * | 4/1990 | Kyrtsos et al. .............. | 177/139 |
| 5,157,610 A | * | 10/1992 | Asano et al. ................ | 701/32 |
| 5,265,481 A | * | 11/1993 | Sonderegger et al. .. | 73/862.625 |
| 5,780,782 A | * | 7/1998 | O'Dea ......................... | 177/136 |
| 5,814,771 A | * | 9/1998 | Oakes et al. ................ | 177/136 |
| 5,822,224 A | * | 10/1998 | Nakanishi et al. .......... | 702/174 |
| 5,995,888 A | * | 11/1999 | Hagenbuch .................. | 701/35 |
| 6,025,563 A | * | 2/2000 | Lesesky et al. ............. | 177/136 |
| 6,118,083 A | * | 9/2000 | Boyovich et al. ........... | 177/136 |
| 6,141,629 A | * | 10/2000 | Yamamoto et al. ......... | 702/187 |
| 6,288,649 B1 | * | 9/2001 | Wolfe .......................... | 340/667 |

FOREIGN PATENT DOCUMENTS

JP 2003-4515 1/2003

* cited by examiner

Primary Examiner—John Barlow
Assistant Examiner—Toan M. Le
(74) Attorney, Agent, or Firm—Armstrong, Kratz, Quintos, Hanson & Brooks, LLP

(57) ABSTRACT

An apparatus for supporting maintenance check of a sensor to maintain sensing accuracy, the sensor 10 generating a changeable weight signal in accordance with a load imposed on a vehicle, includes judging means 30a2 for judging whether or not sensed accuracy of a present weight signal is degraded based on a compared result by comparing the present weight signal fetched by a fetching means 30a1 with a previous weight signal from the sensor that corresponds to the present weight signal and information of judging degradation stored by a storing means 30d, and maintenance check information generating means 30a3 to press for maintenance check of the sensor based on the judged degradation in accordance with judgement of degradation by the judging means 30a2.

4 Claims, 5 Drawing Sheets

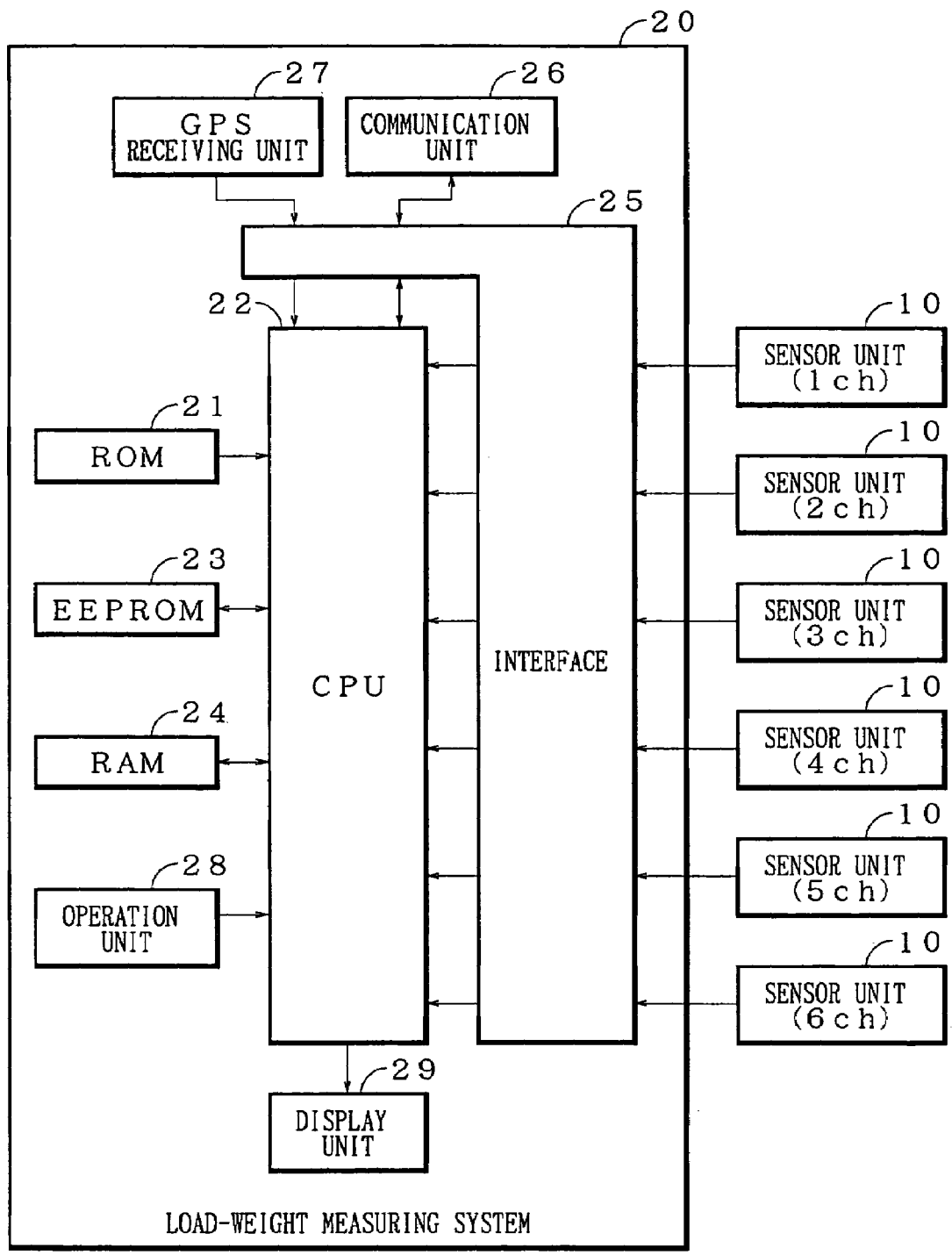
F I G. 3

APPARATUS FOR SUPPORTING MAINTENANCE CHECK OF A SENSOR

BACKGROUND OF THE INVENTION

1. Field of the Invention

This invention relates to an apparatus for supporting maintenance check of a sensor, especially the sensor generating a changeable weight signal accordance with a load imposed on a vehicle.

2. Description of the Related Art

Usually in a large vehicle such as a motor truck, a load weight is measured by a load-weight measuring device mounted in the vehicle for preventing a traffic accident such a tumble on side by overload weight or offset load and degradation of the vehicle or a road surface. According to the load-weight measuring device, for measuring a load weight at a point by a sensor such as a sensing element mounted on front/rear axles of the vehicle, the load weight is detected based on a changeable signal in accordance with a weight signal outputted from the sensor.

A strain gage sensor to detect a strain may be used as the sensor. An output signal from the sensor is calculated so as to measure a load weight corresponding to a measuring object and the measuring result may be displayed on a display portion. When overload or offset load is detected based on the load weight, warning display or warning sound may be informed for a vehicle driver.

The sensor used in the load-weight measuring device is generally received and fixed in a case member formed correspondingly to a shape of the sensor. The sensor fixed in the case member is received and fixed in a receiving recess formed in the measuring object correspondingly to a shape of the case member.

The above case member is fixed on the axle by welding such as laser welding and resistance welding so that strength of weld zone may be reduced by poor weld. When the weld zone is cracked by vibration of vehicle driving, the output from the sensor may become wrong value so that the right load weight cannot be measured.

Therefore, a sensor unit, generating a warning signal by warning signal generating means corresponding to an abnormal weight signal generated by the sensor when the abnormal weight signal is detected by detecting means for detecting abnormal weight signals after a unit body is welded on the axle of the vehicle or a carrier frame, and a load-weight measuring device alarming abnormality of the sensor unit accordingly to the warning signal generated in the sensor unit were proposed by this applicant. See a following cited reference.

The reference is Japan Patent Application Laid Open 2003-4515.

Objects To Be Solved

Requirement of material accounting of objects based on the load weight measured by the load-weight measuring device is increasing. Because of measurement principle of the load-weight measuring device, its measurement accuracy is changed with age. Permanent strain of the vehicle structure and reduced welding strength of the sensor are considered as causes of change with age. The measurement accuracy required by users can be maintained by means of periodical operation of check, calibration and adjustment of the sensor. Shorter period of operation is preferable, but not accepted because of increased operation cost and limitation of operation time. Therefore, method of maintaining the sensing accuracy of the sensor is required.

To overcome the above drawback, one object of this invention is to provide an apparatus for supporting maintenance check to ensure the sensing accuracy of the sensor.

SUMMARY OF THE INVENTION

How to Attain the Object

In order to attain the objects, an apparatus for supporting maintenance check of a sensor according to this invention is an apparatus for supporting maintenance check of a sensor 10 generating a changeable weight signal in accordance with a load imposed on a vehicle as shown in FIG. 1. The apparatus for supporting maintenance check of a sensor is specified by including storing means 30d for storing information of judging degradation of sensing accuracy of the sensor 10, fetching means 30a1 for fetching the weight signal generated by the sensor 10, judging means 30a2 for judging whether or not sensed accuracy of a present weight signal generated by the sensor 10 is degraded based on a compared result obtained by comparing the present weight signal fetched by the fetching means 30a1 with a previous weight signal fetched from the sensor 10 that corresponds to the present weight signal and the information of judging degradation stored by the storing means 30d, maintenance check information generating means 30a3 to press for maintenance check of the sensor 10 based on the judged degradation thereof in accordance with judgement of degradation by the judging means 30a2, and output means 30a4 for outputting the information of maintenance check generated by the generating means 30a3 to press for the maintenance check.

According to above structure, when the fetching means 30a1 fetches a present weight signal generated by the sensor 10, the present weight signal is compared with a previous weight signal fetched from the sensor 10 corresponding to the present weight signal by the fetching means 30a1. The judging means 30a2 judges whether or not the sensed accuracy of the present weight signal generated by the sensor 10 is degraded based on the compared result and the information of judging degradation. Thereafter, the information of maintenance check to press for maintenance check of the sensor 10 judged degradation thereof in accordance with judgement of degradation by the judging means 30a2 is generated by the maintenance check information generating means 30a3, and the information of maintenance check is outputted to a communication system or display system by the output means 30a4 to press for the maintenance check.

Thus, when the present weight signal from the sensor 10 is fetched, it is judged whether or not the sensed accuracy of the present weight signal is degraded based on the compared result obtained by comparing the present weight signal with the previous weight signal and the information of judging degradation, and the information of maintenance check to press for maintenance check is outputted in accordance with judgement of degradation. Thereby, the maintenance check of the sensor is operated accordingly to the information of maintenance check so that the maintenance check can be done at the time when degradation of the sensing accuracy of the sensor is judged before the sensor is broken. Therefore, the sensing accuracy of the sensor 10 can be maintained in high range. A plurality of the sensors 10 is mounted on a vehicle and degradations of respective sensors with age are deferent. By checking respectively the degradation of sensors 10, each sensor 10 can be maintained suitably. Thus, by supporting maintenance check of the sensor 10 to prevent degradation of sensing accuracy, the sensing accuracy of the sensor 10 can be secured. Therefore, material accounting of objects based on the load weight measured by the weight signal generated by the sensor 10 can be performed.

In order to attain the objects, the apparatus for supporting maintenance check of a sensor according to this invention is more specified as shown in FIG. 1 in the aforesaid apparatus for supporting maintenance check of a sensor by that the previous weight signal is a reference weight signal generated by the sensor 10 correspondingly to a predetermined weight, and the fetching means 30a1 for fetching the weight signal fetches the weight signal generated by the sensor 10 correspondingly to the predetermined weight.

According to the apparatus for supporting maintenance check of a sensor mentioned above, when the weight signal corresponding to the predetermined weight from the sensor 10 is fetched by the fetching means 30a1, the weight signal is compared with the reference weight signal by the judging means 30a2 and judging degradation based on the compared result and the information of judging degradation is performed. Thus, the reference weight signal generated by the sensor 10 correspondingly to the predetermined weight is defined as the previous weight signal and the weight signal corresponding to the predetermined weight is fetched. Thereby, the predetermined weight may be defined by considering the condition of load weight corresponding to the operation of the vehicle, for example by an empty load, an operation to adjust a condition of load weight for fetching the weight signal can be eliminated.

In order to attain the objects, the apparatus for supporting maintenance check of a sensor according to this invention is furthermore specified as shown in FIG. 1 in the aforesaid apparatus for supporting maintenance check of a sensor by that the information of judging degradation stored by the storing means 30d for storing information of judging degradation is generated based on the sensing accuracy of the sensor demanded by the owner of the vehicle.

According to the apparatus for supporting maintenance check of a sensor mentioned above, the information of judging degradation based on the sensing accuracy of the sensor 10 demanded by the owner of the vehicle stored by the storing means 30d for is stored in storing means 30d for storing information of judging degradation, and the degradation of the sensor 10 is judged based on the information of judging degradation by the judging means 30a2. Thus, by storing the information of judging degradation based on the sensing accuracy of the sensor demanded by the owner of the vehicle, and judging the degradation of the sensor 10 based on the information of judging degradation, and judging the degradation of the sensor 10 when the sensing accuracy of the sensor demanded by the owner of the vehicle is not maintained, the information of maintenance check is generated and outputted. Thereby, the sensing accuracy of the sensor demanded by the owner of the vehicle can be maintained by the maintenance check based on the information of maintenance check. Therefore, material accounting of objects based on the load weight measured by the weight signal generated by the sensor 10 can be performed more accurately.

The above and other objects and features of this invention will become more apparent from the following description taken in conjunction with the accompanying drawings.

BRIEF DESCRIPTION OF THE DRAWINGS

FIG. 3 is a block diagram of a load-weight measuring system in FIG. 2;

DESCRIPTION OF THE PREFERRED EMBODIMENT

An embodiment of an apparatus for supporting maintenance check according to this invention is explained as following with reference with FIG. 2–7.

Figures 1, 6:
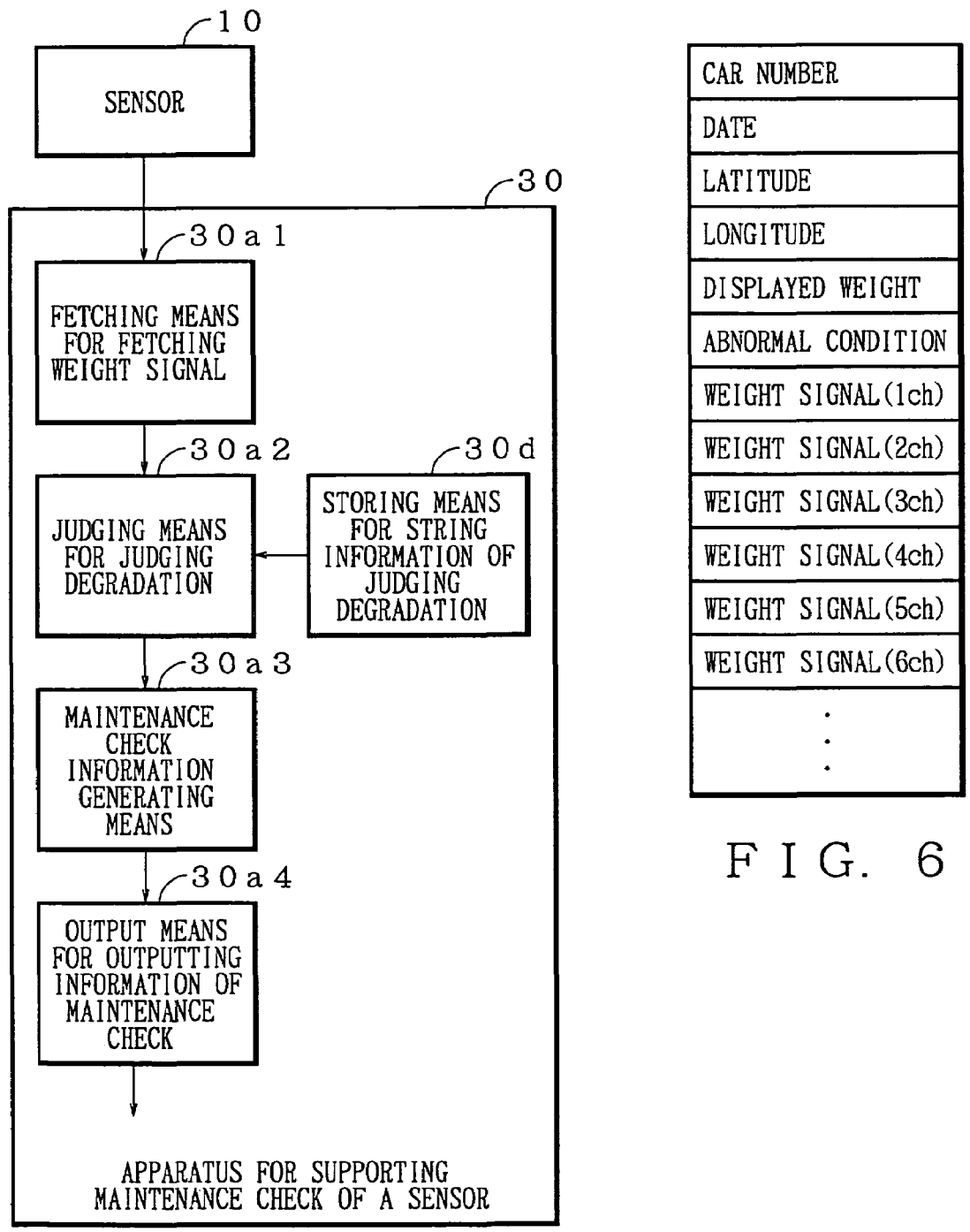
FIG. 1 is a block diagram of basic structure of an embodiment of an apparatus for supporting maintenance check of a sensor according to this invention.
FIG. 6 is an example drawing showing a data structure of sensor information.
Figure 2:
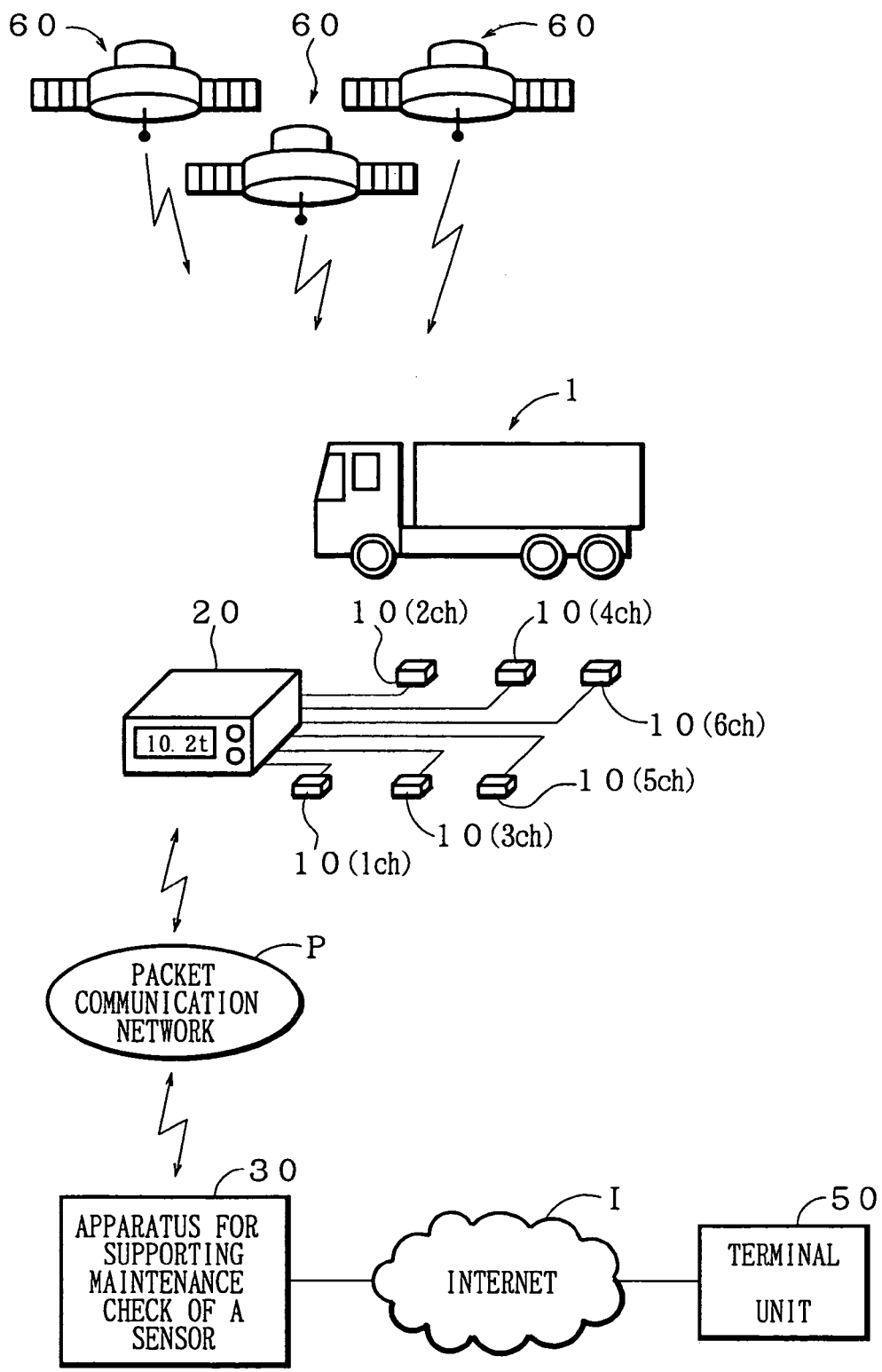
FIG. 2 is a block diagram showing an outline structure of a maintenance check system with the apparatus for supporting maintenance check of a sensor according to this invention.
Figure 4:
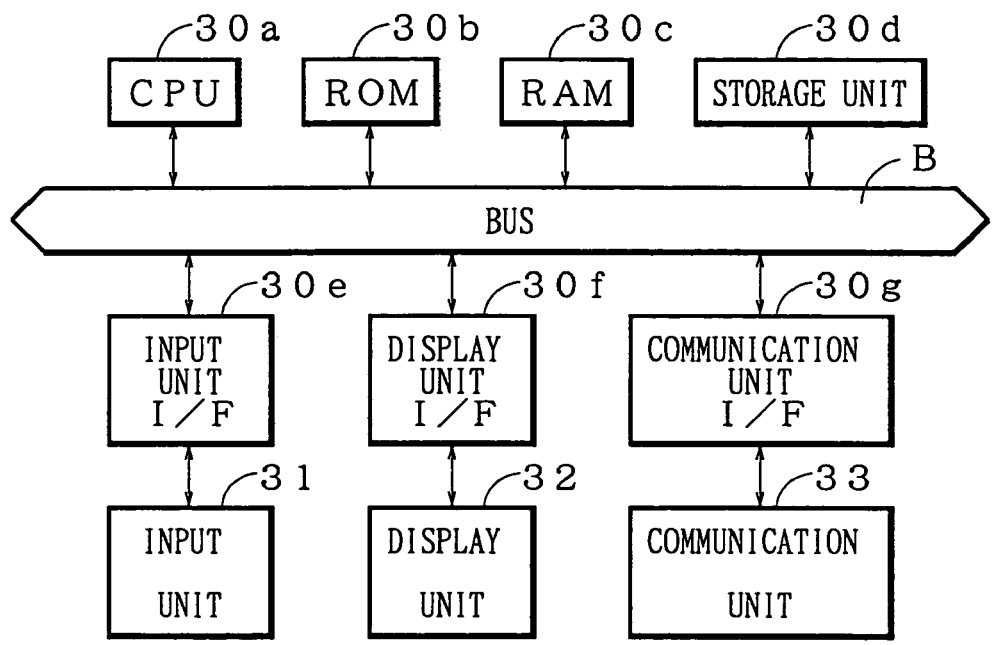
FIG. 4 is a block diagram of the apparatus for supporting maintenance check of a sensor in FIG. 2.
Figure 5:
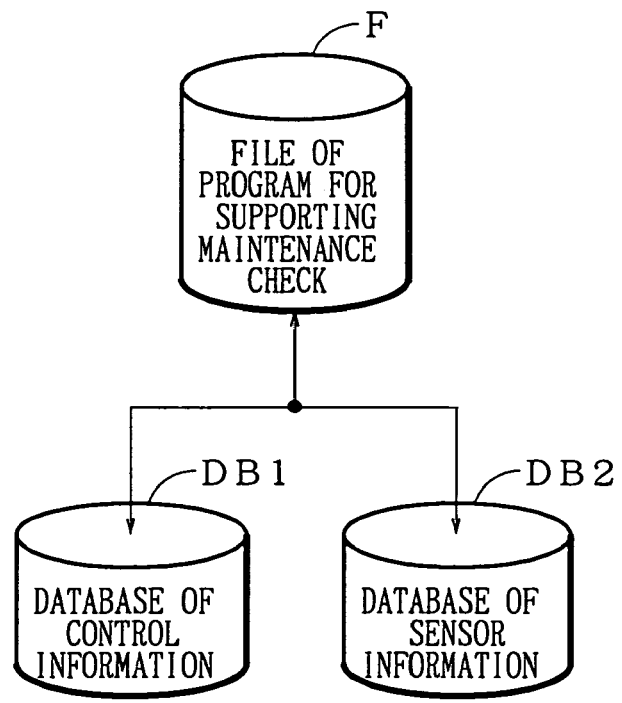
FIG. 5 is a block diagram showing an example of a file structure of the apparatus for supporting maintenance check of a sensor in FIG. 4.
Figure 7:
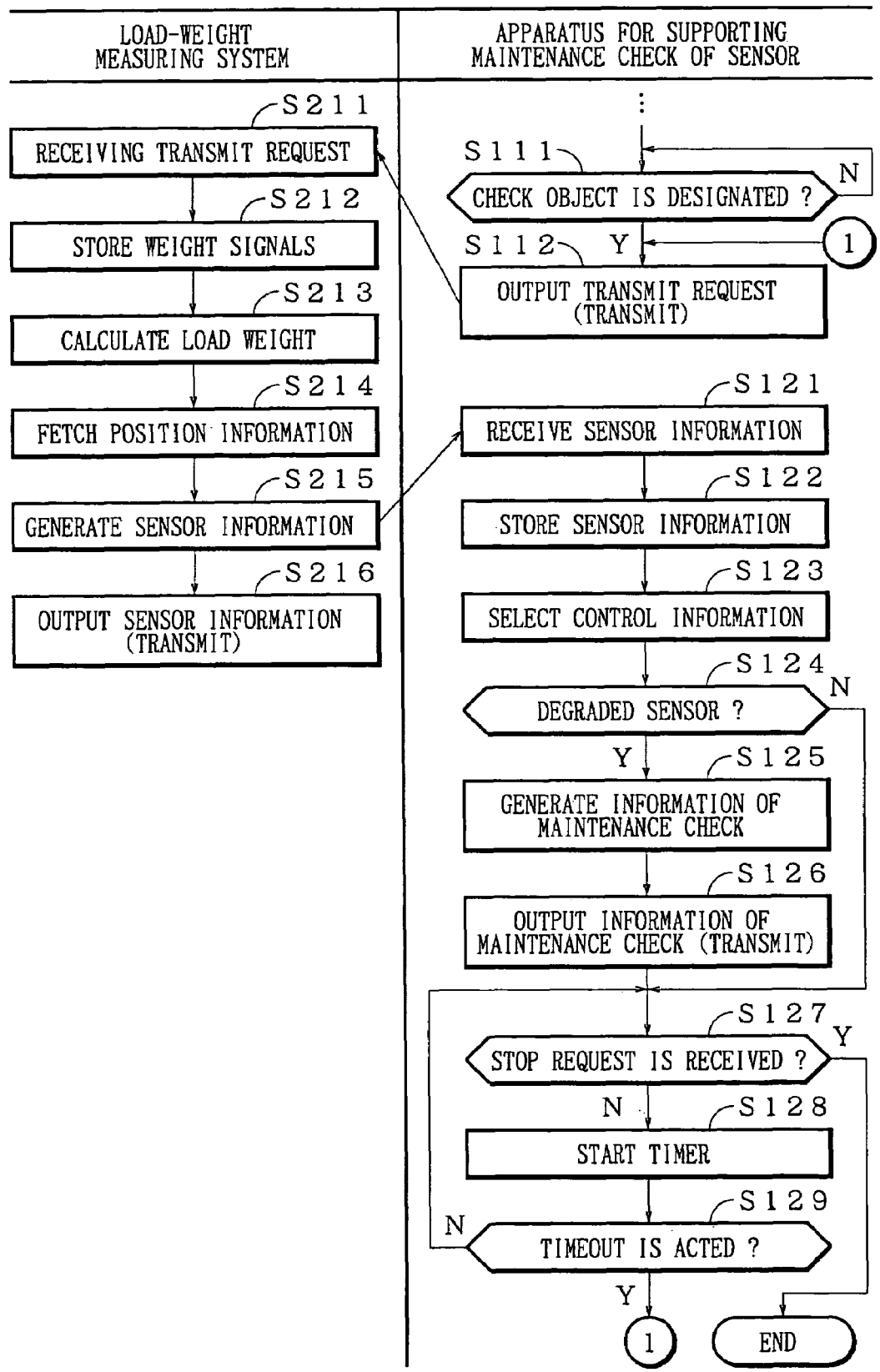
FIG. 7 is a flowchart showing an example of processes performed by respective CPUs of the load-weight measuring system and the apparatus for supporting maintenance check of a sensor.

FIG. 2 is a block diagram showing an outline structure of a maintenance check system with the apparatus for supporting maintenance check of a sensor according to this invention. FIG. 3 is a block diagram of a load-weight measuring system 20 in FIG. 2. FIG. 4 is a block diagram of the apparatus for supporting maintenance check of a sensor 30 in FIG. 2. FIG. 5 is an example of a file structure of the apparatus for supporting maintenance check of a sensor 30 in FIG. 4. FIG. 6 is an example of a data structure of sensor information. FIG. 7 is a flowchart showing an example of processes performed by respective CPUs of the load-weight measuring system 20 and the apparatus for supporting maintenance check of a sensor 30.

The maintenance check system includes, as shown in FIG. 2, sensor units 10 welded on axles close to respective tires of a vehicle 1 by laser welding or electric resistance welding for generating a weight signal with each frequency corresponding to a load weight on the vehicle 1, the load-weight measuring system 20 installed in an area of a driving seat of the vehicle 1 for measuring the load weight of the vehicle in accordance with the weight signal generated by the sensor units 10 and displaying the measuring result, and the apparatus for supporting maintenance check of a sensor 30 to support maintenance check for a plurality of sensor units 10. The load-weight measuring system 20 and the apparatus for supporting maintenance check of a sensor 30 can transmit and receive various kinds of information through a packet communication network P to each other.

The maintenance check system is further provided at a company for maintaining the sensor units and a company having the vehicle 1 for transporting, and includes a terminal unit 50 such as a personal computer, a mobile phone and a PDA (Personal Digital Assistants). The terminal unit 50 and the apparatus for supporting maintenance check of a sensor 30 can transmit and receive various kinds of information to each other through the Internet I.

The sensor unit mounted at a left front wheel is connected as 1ch, and the sensor unit mounted at a right front wheel is connected as 2ch, and the sensor unit mounted at a front-left rear wheel is connected as 3ch, and the sensor unit mounted at a front-right rear wheel is connected as 4ch, and the sensor unit mounted at a rear-left rear wheel is connected as 5ch, and the sensor unit mounted at a rear-right rear wheel is connected as 6ch with the load-weight measuring unit 20. Each sensor unit 10 has a sensor such as a strain gage to output a weight signal corresponding to strain of the axle, and processes the weight signal outputted by the sensor to be amplified and compensated, and converts the weight signal to a frequency signal and outputs the frequency signal to the load-weight measuring system 20.

This embodiment by converting the weight signal to the frequency signal is explained. The weight signal may be outputted by means of converting to a voltage signal or a digital signal.

In this embodiment, the vehicle 1 has six wheels so that the case of six sensor units 10 connected with the load-weight measuring system 20 is explained. This invention is not limited in this, but when a vehicle has four wheels, four sensor units 10 are applied. Mounted position of the sensor unit 10 is not limited in the axle, but the sensor unit 10 may be welded on any member capable to measure strain value corresponding to a load weight, such as a carrier frame.

An embodiment of the load-weight measuring system 20 is explained on the structure as following.

In FIG. 3, mark 21 shows a read-only memory (ROM) storing a program and a fixed-value datum. Mark 22 shows a central processing unit (CPU) operated by a control program stored in the ROM 21.

Mark 23 shows an electrically erasable and programmable read-only memory (EEPROM) storing information of car numbers for distinguishing the vehicle 1, information of judging overload for judging whether or not the measured load-weight is overload, information of judging offset load for judging whether or not the load-weight is offset load, and information of transmit address for each information. Mark 24 shows a memory capable to read and write freely (RAM) having a data-area for storing various data used in process of CPU 22 and a work-area to be used in processing.

The CPU 22 of the load-weight measuring system 20 is connected with an interface 25. The interface 25 can be connected with the aforesaid 1ch–6ch sensor units 10 outputting weight signals corresponding to load weights. Thereby, the weight signals generated by respective sensor units 10 are inputted through the interface 25 into the CPU 22.

The interface 25 is connected with a communication unit 26 and a GPS receiving unit 27. The communication unit 26 transmits information inputted from the CPU 22 to a designated transmitting address by radio with a mobile phone or a radio equipment, and outputs various kinds of information received from a system such as the apparatus for supporting maintenance check 30 at a distant place into the CPU 22.

The GPS receiving unit 27 receives a radio wave, radiated by a plurality of an artificial satellite 60 (see FIG. 2) constructing the Global Positioning. System GPS, with a GPS antenna (not shown), to calculate the present position of the GPS receiving unit 27, and outputs information of the present position to the CPU 22 through the interface 25. A method of detecting position by the GPS receiving unit 27 is a well-known usual GPS capable to calculate the accurate position of the GPS receiving unit 27 by measuring each time in which each radio wave from at least three artificial satellites 60 reaches to the GPS receiving unit 27.

The load-weight measuring system 20 further includes an operation unit 28 and a display unit 29 those are respectively connected with the CPU 22. The operation unit 28 and the display unit 29 are disposed at a front surface of a main body of the system. An input datum generated by operating the operation unit 28 is inputted into the CPU 22. The display unit 29 shows various kinds of information such as a load weight and a warning in accordance with instructions by the CPU 22.

The load-weight measuring system 20 structured as mentioned above measures the load weight of the vehicle 1 based on the weight signals generated by the 1ch–6ch sensor units 10, and displays the measured result at the display unit 29. When the measured result is overload, warning is issued for a vehicle driver.

The apparatus for supporting maintenance check of a sensor 30 provided at a manufacturer of the load-weight measuring system 20 and the sensor units 10 installed in the vehicle 1, a maintenance company for them, or a transport company buying them is explained about the structure.

The apparatus for supporting maintenance check of a sensor 30 using a known computer includes a central processing unit (CPU) 30a for controlling operations of whole apparatus in accordance with a predetermined program as shown in FIG. 4. The CPU 30a is connected through a bus B with a read-only memory ROM 30b storing the program for the CPU 30a, and a memory to read and write freely RAM 30c having a work area for storing various data required for processing by the CPU 30a.

The CPU 30a is further connected through the bus B with a storage unit 30d such as a hard disk device. Various files such a file of a later-described program for supporting maintenance check for making the computer perform as the apparatus for supporting maintenance check 30 and various databases are stored in the storage unit 30d.

The CPU 30a is further connected through the bus B with an input unit interface (I/F) 30e, a display unit interface (I/F) 30f and a communication unit interface (I/F) 30g. An input unit 31 including a keyboard or a mouse is connected with the input unit I/F 30e and various data inputted from the input unit 31 are inputted through the bus B into the CPU 30a.

A display unit 32 including a CRT or an LCD display is connected with the display unit I/F 30f. The display unit I/F 30f controls display image at the display unit 32 in accordance with commands by the CPU 30a.

A communication unit 33 such as a LAN card for connecting with a network connectable to a modem, mobile phone modem or Internet I is connected with the communication unit I/F 30g. The communication unit 33 may receive various kinds of information through a packet communication network P from the load-weight measuring system 20, and transmit various kinds of information from the CPU 30a to the load-weight measuring system 20. The communication unit 33 may also transmit and receive various data such as an electronic mail through the Internet I.

The various kinds of information stored in the storage unit 30d of the apparatus for supporting maintenance check of a sensor 30 is described.

The aforesaid storage unit 30d stores a file F of a program for supporting maintenance check, a database of control information DB1 and a database of sensor information DB2 as shown in FIG. 5.

The program for supporting maintenance check in the file F is a program to operate the computer for supporting maintenance check of the sensor unit 10 (sensor) generating the changeable weight signal correspondingly to the load weight on the vehicle 1. The program for supporting maintenance check makes the computer perform fetching means for fetching the weight signal generated by the sensor 10, judging means for judging whether or not the sensed accuracy of a present weight signal generated by the sensor 10 is degraded based on a compared result obtained by comparing the present weight signal fetched by the fetching means with a previous weight signal fetched from the sensor 10 that corresponds to the present weight signal by the fetching means and information of judging degradation predetermined for judging degradation of the sensing accuracy of the sensor 10, generating means for generating information of maintenance check pressing for maintenance check about the sensor 10 judged degradation thereof in accordance with judgement of degradation by the judging means, and output means for outputting the information of maintenance check generated by the generating means to press for the maintenance check.

The database of control information DB1 includes various kinds of information, required to control the load-weight measuring system 20 and the sensor units 10 connected with the load-weight measuring system 20, stored correspondingly to the load-weight measuring system 20. In this embodiment, the control information includes control information of the system, owner information, control information of sensors, information of judging degradation for judging degradation of the sensing accuracy of the sensor 10 and information of reference weight signal.

The control information of the system includes a car number of the vehicle 1 with the load-weight measuring system 20, a phone number of the system, a communication address such as a IP address, an identification number of the system. The owner information includes an identification number for identifying owner, a communication address and a transmit address for information of maintenance check. The control information of sensors includes an identification number of the connected load-weight measuring system 20, an identification number of the sensor for identifying the sensor unit 10, a mount position of the sensor unit in the vehicle 1 and a storing address of the sensor information fetched from the load-weight measuring system 20.

When load weight on the vehicle 1 is 0 Kg meaning empty load, the sensor unit 10 is set to generate a predetermined weight signal by offset adjusting. The adjusted weight signal is defined as a reference weight signal, and the information of judging degradation includes a condition of judging for judging degradation based on changing value between the reference weight signal (or the previous weight signal) and a later-generated weight signal. The information of judging degradation is stored in the storage unit 30*d*. The storage unit 30*d* performs as the storing means for information of judging degradation described in this specification.

The apparatus for supporting maintenance check 30 according to this embodiment can change the condition of judging in accordance with request by the owner of the vehicle 1. Thereby, when material accounting of objects based on the load weight measured by the load-weight measuring system 20 is required, the sensing accuracy of the load-weight measuring system 20 can be prevented from degradation by setting the condition of judging tight. Thus, material accounting based on the accurate load weight measured by the load-weight measuring system 20 can be performed.

The information of reference weight signal has the reference weight signals (1ch–6ch) generated at the sensor units 10 when offset adjusting for the sensor units 10 is respectively completed. According to this invention, a weight signal of the sensor information fetched firstly from the load-weight measuring system 20 may be set as the reference weight signal.

The database of sensor information DB2 stores the sensor information fetched from the load-weight measuring system 20 in time series correspondingly to each load-weight measuring systems 20. The sensor information includes the car number of the vehicle 1, the date of measuring, the latitude and the longitude defining the position of the vehicle 1 on measuring time (position information), the displayed weight displayed at the display unit 29 by the load-weight measuring system 20 on measuring time, abnormal condition like an overload or offset load of the measured load weight, the weight signals (1ch–6ch) fetched from the each sensor units 10, as shown in FIG. 6.

In this embodiment, various files such as the aforesaid file F of program for supporting maintenance check are installed on the storage unit 30*d* by means of a recording medium such as a CD-ROM capable to be read by a computer. This invention does not limit such recording medium, but downloading through Internet I may perform installing the files.

An embodiment of respective processing by the CPU 22 of the load-weight measuring system 20 and the CPU 30*a* of the apparatus for supporting maintenance check 30 in the maintenance check system according to this invention is described with reference to a flowchart shown in FIG. 7.

In the apparatus for supporting maintenance check 30 shown in FIG. 7, when the program for supporting maintenance check in the file F is executed, a screen for inputting is displayed at the display unit 32, and it is judged whether or not a check object is designated based on an input datum from the input unit 31 (S111). When it is judged that the check object is not designated (N at S111), the process step waits for that the check object is designated by repeating this judge process.

When it is judged that the check object is designated (Y at S111), the control information regarding the check object is selected from the database of control information DB1 and sent to the RAM 30*c*. A transmit request for requesting the designated load-weight measuring system 20 to transmit the sensor information is generated based on the control information, and the transmit request is outputted to the communication unit I/F 30*g*. Thereby, the communication unit 33 transmits the transmit request to the load-weight measuring system 20 (S112).

In the load-weight measuring system 20, when the transmit request received at the communication unit 26 is stored at the RAM 24 (S211), the weight signals generated respectively at each sensor unit 10 are stored at the RAM 24 so as to be distinguished correspondingly to the 1ch–6ch sensor units 10 (S212). The load weight is calculated based on the weight signals (S213).

Thereafter, the position information detected by the GPS receiving unit 27 is fetched (S214) and the aforesaid sensor information is generated based on the position information, the calculated load weight and fetched weight signals (raw data) (S215). The sensor information to be transmitted to the transmit address designated by the information of transmit address at the EEPROM 23 is outputted to the communication unit 26 and the sensor information is transmitted to the apparatus for supporting maintenance check of a sensor 30 (S216).

In the apparatus for supporting maintenance check of a sensor 30, the sensor information received at the communication unit 33 is fetched in the RAM 30*c* (S121). The sensor information is stored in the storage unit 30*d* in time series in memory area of the database of sensor information DB2 correspondingly to each load-weight measuring systems 20 (S122). In this embodiment, the sensor information having the weight signal is fetched. Thereby, process S121 corresponds to the fetching means for fetching weight signal in this specification.

The control information corresponding to the car number of the sensor information is selected from the database of control information DB1 (S123). By judging whether or not the condition of judging specified by the information of judging degradation in the control information is fulfilled by a difference of comparing the weight signal in the fetched sensor information and the reference weight signal in the information of the reference weight signal of the control information, existence of degraded sensor units 10 in the 1ch–6ch sensor units 10 is judged (S124, judging means for judging degradation). When it is judged that no degraded sensor unit 10 exists (N at S124), all sensor units 10 is normal so that the process goes to step S127.

When it judged that a degraded sensor unit 10 exists (Y at S124), the information of maintenance check to press for maintenance check of the degraded sensor unit 10 is generated based on the control information and the sensor information fetched at present (S125, generating means for generating information of maintenance check). The information of maintenance check to be transmitted to the transmit address specified by the owner information of the control information is outputted to the communication unit 30g and transmitted to a terminal unit 50 (S126, output means for outputting the information of maintenance check).

The information of maintenance check, for example, includes a car number of the vehicle having the degraded sensor unit 10, a position of the vehicle, the date of detecting the degradation, the mount position of the sensor unit 10, the weight signal detected at present and the reference weight signal. Thereby, by presuming causes of the degradation of the sensor unit 10 from the information of maintenance check, maintenance check can be performed.

In step S127, it is judged whether or not stop request is received based on the input data from the input unit 31. When it is judged that the stop request is received (Y at S127), the process is stopped. When it is judged that the stop request is not received (N at S127), a timer acting timeout after a predetermined period (for example 24 hours) is started (S128) Thereafter, it is judged whether or not the timer acts timeout (S129). When it is judged that the timer does not act timeout (N at S129), the process returns to step S127 and this chain of process are repeated. When it is judged that the timer act timeout (Y at S129), the process returns to step S112 and chain of process are performed. Thereby, the next sensor information is fetched and judging degradation of sensing accuracy of the weight signal specified by the sensor information is performed.

As aforesaid description, the CPU 30a of the apparatus for supporting maintenance check 30 performs as the fetching means for fetching weight signal, judging means for judging degradation, generating means for generating information of maintenance check and output means for outputting information of maintenance check.

An example of operation in the aforesaid maintenance check system is described as following.

When adjusting the 1ch–6ch sensor units 10 mounted on the vehicle 1 is finished, the weight signals generated by the sensor units 10 at empty load condition of the vehicle are stored as the reference weight signals in the database of control information DB1 in the apparatus for supporting maintenance check of a sensor 30. When designation of a monitored object for maintenance check is inputted into the apparatus for supporting maintenance check of a sensor 30, the apparatus for supporting maintenance check of a sensor 30 transmits the transmit request to the load-weight measuring system 20 connected with the sensor unit 10 to be the monitored object.

The load-weight measuring system 20 fetches the weight signals from respective the 1ch–6ch sensor units 10 in accordance with the transmit request, and generates the sensor information including theses weight signals, the load weight based on the weight signals and the present position of the vehicle 1, and transmits the sensor information to the apparatus for supporting maintenance check of a sensor 30.

The apparatus for supporting maintenance check of a sensor 30 which fetches the sensor information judges whether or not the sensing accuracy is degraded based on a compared result obtained by comparing the weight signal of the sensor information with the reference weight signal of the control information that corresponds to the sensor information and the information of judging degradation in the control information. When it is judged that the sensor is not degraded, the apparatus for supporting maintenance check of a sensor 30 repeats judging the degradation by fetching the weight signal from the load-weight measuring system 20 after every passing predetermined period.

When it is judged that the sensor is degraded, the apparatus for supporting maintenance check of a sensor 30 generates information of maintenance check to press for maintenance check of the degraded sensor unit 10 and transmits the information of maintenance check to the terminal units 50 at the company for maintaining and the company having the vehicle 1 for transporting. The terminal units 50 make arrangement of the maintenance check based on the received information of maintenance check. Thus, the sensor unit 10 designated by the information of maintenance check is checked.

As mentioned above, when the weight signal is fetched from the sensor units 10, the apparatus for supporting maintenance check 30 judges the degradation of the sensor and outputs information of maintenance check to press for maintenance check. The sensor unit 10 is acted by maintenance check when the degradation of the sensor is judged before the sensor is broken. Therefore, the sensing accuracy of the sensor unit 10 can be maintained in high range.

For measuring load weight of the vehicle 1, a plurality of sensor units 10 is mounted on the vehicle 1. Each aging condition of the sensor units 10 is different, but since each sensor units 10 are monitored respectively, maintenance check suitable for each sensor units 10 can be performed.

Therefore, the sensing accuracy of the sensor units 10 can be maintained by the maintenance check by supporting to prevent the degradation of the sensing accuracy, so that material accounting of objects based on the load weight measured by the weight signal generated by the sensor 10 can be performed.

As mentioned the above embodiment, the weight signal generated by the sensor unit 10 is fetched through the load-weight measuring system 20 into the apparatus for supporting maintenance check of a sensor 30. This invention does not limit above, but the weight signal can be fetched directly from the sensor unit 10 to the apparatus for supporting maintenance check 30.

The functions of the apparatus for supporting maintenance check 30 may be performed at the load-weight measuring system 20. For example, a function of supporting maintenance check can be added in the load-weight measuring system 20. In detail, a program which makes the CPU 22 of the load-weight measuring system 20 perform for generating information of maintenance check and transmitting the information to the company for maintenance or the company having the vehicle 1 for transporting when degradation of the sensing accuracy of weight signal fetched from the sensor unit 10 is judged is added in the ROM 21.

Although the present invention has been fully described by way of examples with reference to the accompanying drawings, it is to be noted that various change and modifications can be made with the scope of the present invention as defined by the following claims.

What is claimed is:

1. An apparatus for supporting maintenance check of a sensor, said sensor generating a changeable weight signal in accordance with a load imposed on a vehicle, comprising:
    storing means for storing information of judging degradation of sensing accuracy of said sensor;
    fetching means for fetching the weight signal generated by said sensor;
    judging means for judging whether or not sensed accuracy of a present weight signal generated by said sensor is degraded based on a compared result obtained by comparing said present weight signal fetched by said fetching means with a previous weight signal fetched from said sensor that corresponds to said present weight signal and said information of judging degradation stored by said storing means;
    maintenance check information generating means to press for maintenance check of said sensor based on the judged degradation thereof in accordance with judgement of degradation by said judging means; and
    output means for outputting information of maintenance check generated by said generating means to press for said maintenance check.

2. The apparatus for supporting maintenance check of a sensor according to claim 1, wherein said previous weight signal is a reference weight signal generated by said sensor correspondingly to a predetermined weight, and said fetching means for fetching the weight signal fetches the weight signal generated by said sensor correspondingly to said predetermined weight.

3. The apparatus for supporting maintenance check of a sensor according to claim 1, wherein said information of judging degradation stored by said storing means for storing information of judging degradation is generated based on said sensing accuracy of said sensor demanded by an owner of said vehicle.

4. The apparatus for supporting maintenance check of a sensor according to claim 2, wherein said information of judging degradation stored by said storing means for storing information of judging degradation is generated based on said sensing accuracy of said sensor demanded by an owner of said vehicle.

* * * * *